Figure 2A:
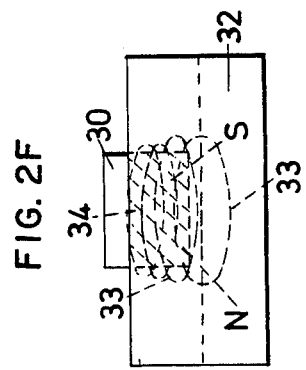

United States Patent [19]

Ridler et al.

[11] 4,065,188
[45] Dec. 27, 1977

[54] LINEAR BEARING FOR PARALLEL TRACKING ARM

[75] Inventors: Keith Douglas Ridler, Fulbourn; Alexander Bennett Gosling, Linton; Gordon Malcolm Edge, Saffron Walden, all of England

[73] Assignee: Strathearn Audio Limited, Great Britain

[21] Appl. No.: 705,026

[22] Filed: July 14, 1976

Related U.S. Application Data

[63] Continuation of Ser. No. 548,602, Feb. 10, 1975, abandoned.

[51] Int. Cl.² ............... F16C 39/06; F16C 32/04
[52] U.S. Cl. ............... 308/10; 104/148 MS; 274/23 A

[58] Field of Search ............ 308/10, 188, 201, 207; 310/12, 13; 192/5, 21; 274/23 A, 134; 104/134, 136, 148 MS; 318/135, 685

[56] References Cited

U.S. PATENT DOCUMENTS

| | | | |
|---|---|---|---|
| 3,101,952 | 8/1963 | Godfrey | 274/23 A |
| 3,235,267 | 2/1966 | Rangabe | 274/23 A |
| 3,374,037 | 3/1968 | Weinberger | 308/10 |
| 3,384,427 | 5/1968 | McHugh | 308/10 |
| 3,612,630 | 10/1971 | Rosensweig | 308/10 |
| 3,734,578 | 5/1973 | Rosensweig | 308/10 |
| 3,741,613 | 6/1973 | Pfaler | 308/10 |

Primary Examiner—Richard A. Bertsch
Attorney, Agent, or Firm—Cesari & McKenna

[57] ABSTRACT

A linear bearing arrangement has a slider which slides in a channel in a slide and a layer of magnetic lubricant material which adheres to a magnetized region or regions of the slide, slider or both.

6 Claims, 14 Drawing Figures

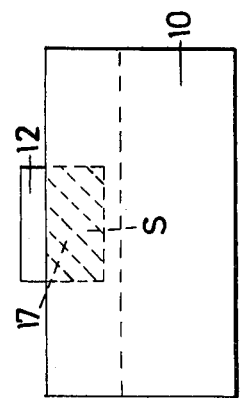
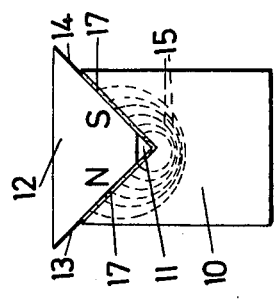
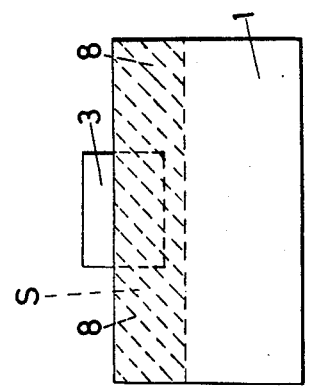
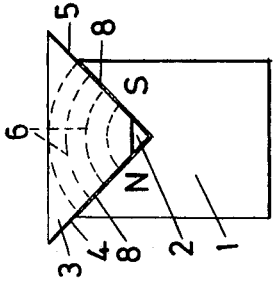

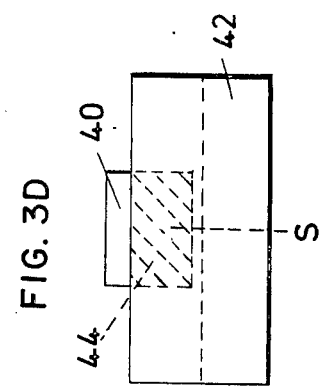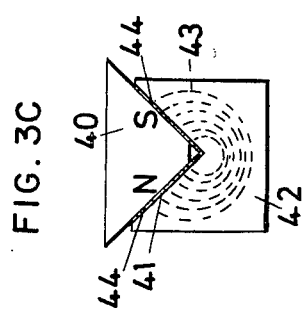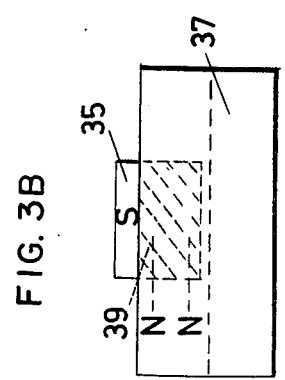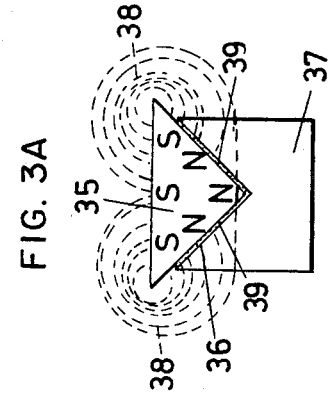

LINEAR BEARING FOR PARALLEL TRACKING ARM

This is a continuation, of application Ser. No. 548,602 filed Feb. 10, 1975, now abandoned.

This invention relates to a linear bearing which is suitable for use with a parallel tracking pick-up arm for a gramophone.

One way of overcoming certain difficulties associated with conventional pivoted gramophone pickup arms caused, for example, by pivot friction, lead resistance, stylus/groove friction, and system geometry, is to use a parallel or radial tracking arm. In such arrangements, a cartridge and stylus are carried by an arm which remains tangential to the groove of the disc being played, by virtue of the corresponding motion of the supported end of the arm to that carrying the cartridge. This supported end may be passive, simply riding on a low friction linear bearing. However, undesirable loads between a stylus and a groove can occur, especially if the groove is eccentric.

Parallel tracking arms have been proposed with linear bearings for example a liquid flotation bearing, in which a carriage for a pickup arm floats in a trough of a suitable fluid so that it can move freely along the trough with very low resistance to motion. The use of relatively unconstrained liquid results in bulky containing equipment and complex arm controlling devices and spillage is a distinct possibility. Another arm which has been proposed uses several pads (of for example polytetrafluorethylene (PTFE) or other materials with similar low friction properties) to support a carriage on a pair of polished parallel metal rods and to enable it to slide along the rods.

The present invention is concerned with a linear bearing which is suitable for use with a parallel tracking arm in a gramophone but which can be used in other ways.

Embodiments of the invention will not be described with reference to the accompanying drawings in which:

FIGS. 1A-D are diagramatic views of bearin arrangements,

FIGS. 2A-F are diagramatic views of further bearing arrangements, and

FIGS. 3A-D are diagramatic views of still further bearing arrangements.

Referring to FIGS. 1A and 1B, there are shown a permanent magnet linear slide 1 having a V-shaped channel 2 along its length providing two bearing faces and a slider 3 of a magnetic material having sides 4 and 5 which are designed to fit the V-shaped channel 2. The sides 4 and 5 provide further bearing faces. The slide 1 is magnetised, in the way indicated, so that lines of flux 6 extend from the North pole (N) to the South pole (S) of the magnet across the V-shaped channel 2. The slider 3 is held in the V-shaped channel 2, in the arrangement shown, by the effect of both the magnetic field and gravity, although it would be possible to arrange the assembly in such a way that gravity played little or no part in the holding of the assembly together. The surfaces of the V-shaped channel in the slide 1 are coated by a magnetic fluid lubricant material, for example that sold under the trade name Ferrofluid, as indicated by the dotted lines 8. The lubricant material 8, being magnetic, adheres under the influence of the magnetic field from the slide 1 over the whole of the surfaces of the channel 2 and the surfaces 4 and 5 of the slider 3 are able to slide freely along the V-shaped channel 2 while the slider 3 is constrained by the sides of the V-shaped channel 2 to moving in a straight line.

The term "magnetic material" when used in this specification means a material that is attracted to a permanent magnet and that is magnetised, either temporarily or permanently, when placed in a magnetic field.

Referring to FIGS. 1C and 1D, there is shown an embodiment including a linear slide 10 of a magnetic material having a V-shaped channel 11 providing two bearing surfaces along its length and a permanent magnet slider 12 having sides 13 and 14 providing bearing surfaces which are designed to fit the V-shaped channel 11. The slider 12 is magnetised, in the way indicated, so that lines of flux 15 extend from the North pole (N) to the South pole (S) of the magnet through the slide 10. The sides 13 and 14 of the slider 12 are coated by a magnetic fluid lubricant material, for example that sold by Ferrofluidic Corporation, Burlington, Massachusetts, under the trade name Ferrofluid, as indicated by the dotted lines 17. The lubricant material 17, being magnetic, adheres to the sides 13 and 14 of the slider 12 only and enables the slider 12 to slide freely along the V-shaped channel 11 in which it is constrained without distributing the fluid lubricant 17 along the surfaces of the V-shaped channel 11.

It will be understood that many variations in design of the cross sections of the slide and the slider are possible, as are possible variations in the magnetisation of the slide and slider and the use of a non-magnetic slide or slider with a magnetic slider or slide respectively. Furthermore, the permanent magnet elements may constitute only a part of either the slide or the slider.

Figure 2B:
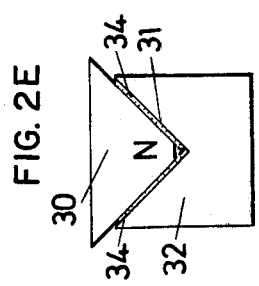

FIGS. 2A and 2B show an arrangement in which there is a permanent magnet linear slide 20 having a U-shaped cross-section which provides a channel 21 along its length. A slider 22 of magnetic material is shown within the channel 21 and the slide is magnetised in the way indicated, so that lines of flux 23 extend through the slider 22 between the North and South poles of the magnet. A coating 24 of a magnetic fluid lubricant material extends over the surfaces of the channel 21 to which it adheres, enabling the slider 22 to slide freely along the channel 21.

Figure 2C:
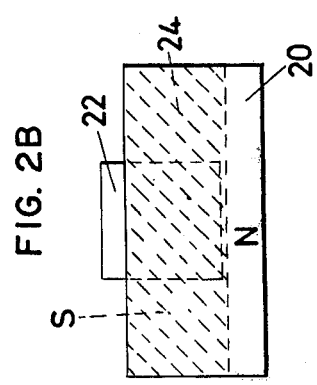
Figure 2D:
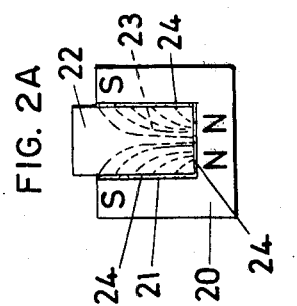

FIGS. 2C and 2D there is shown an arrangement in which a slider 25 is permanently magnetised. The slider 25 slides upon a coating 26 of magnetic fluid lubricant material, which adheres to it, along a channel 27 in a body 28 of magnetic material through which flux 29 from the magnet passes. In this arrangement, as in the arrangement of FIGS. 1C and 1D, the magnetic fluid adheres only to the slider.

Figure 2E:
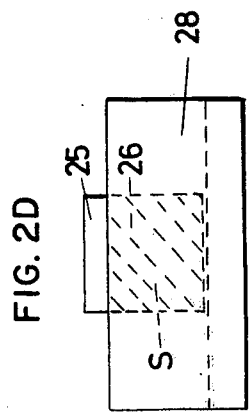
Figure 2F:
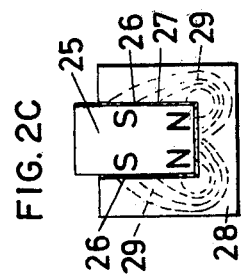

The arrangement shown in FIGS. 2E and 2F include a permanent magnet slider 30, which slides in a V-shaped channel 31 in a body 32 of magnetic material and which appears to be similar to the arrangement of FIGS. 1C and 1D. However, the slider 30 is magnetised longitudinally so that lines of flux 33 pass longitudinally along the body 32 and not transversely across the V-shaped channel. A layer of magnetic fluid lubricant material 34 is retained by the surfaces of the slider 30 which fit the channel 31 and enable the slider 30 to slide freely along the channel.

Referring to FIGS. 3A and 3B, there is shown a slider 35 which is designed to slide in a V-shaped channel 36 in a non-magnetic slide 37 and which is magnetised so that lines of flux 38 extend transversely across the slide 37, the slider 35 being magentised to provide North pole and South pole regions N and S, as indicated. A coating of a magnetic fluid lubricant material 39 is shown attracted to the surfaces of the slider 35 which co-operate with the surfaces of the V-shaped channel 36 and enable the slider to slide freely along the channel.

In FIGS. 3C and 3D there is shown a permanent magnet slider 40 having a cross-section such that it fits into a V-shaped channel 41 in a body 42 of non-magnetic material and being magnetised so that magnetic flux 43 passes from its North to its South pole across the body 42. A coating of a magnetic fluid lubricant material 44 is attracted to the surfaces of the slider 40 within the channel 41 so that the slider 40 is able to slide freely along the channel 41.

Where a magnetic pole appears on a surface which is not concerned with the sliding action, for example the surface of the slider in FIGS. 3A and 3B which has South polarity, care must be taken to prevent the migration of the magnetic fluid to the surface not concerned with the sliding action.

In its application to a bearing for a gramophone pick-up arm the bearing can be used for the whole of a parallel tracking arm stroke. It is also possible to use a bearing employing a magnetic fluid in a bearing of comparatively short stroke carried on a slider running on a linear bearing of similar or different type and extending over the whole of a parallel tracking arm stroke.

Although the invention has been described with reference to particular embodiments, it will be appreciated that variations and modifications can be made within the scope of the invention. For example, it is possible for both the slider and the slide to consist of or contain permanent magnets; thus the magnetic fluid can be held on limited areas of the slide, for example on one or more strips extending along the length of the slide. It is also possible for the slider to be of non-magnetic material and for the slide to have strips which exhibit different magnetic polarities and which extend along the length of each bearing face of the slide.

We claim:

1. A linear bearing arrangement including a slide having a first bearing surface, a slider having a second bearing surface, a thin film of magnetic fluid lubricant material between the said surfaces, the thin film of magnetic fluid lubricant material adhering to one of the said bearing surfaces under the influence of a magnetic field and means to provide a magnetic field extending from one of the said bearing surfaces to the magnetic fluid lubricating material to maintain the said material on said one surface.

2. A linear bearing arrangement according to claim 1 said slide being constituted by a body of non-magnetic material and said slider being constituted by a magnet, the lubricant material adhering to the second bearing surface.

3. A linear bearing according to claim 2 wherein said slider is magnetised transversely of its length.

4. A linear bearing arrangement according to claim 1 said slide being constituted by a body of magnetic material and said slider being constituted by a magnet, the lubricant material adhering to the second bearing surface.

5. A linear bearing arrangement according to claim 1 said slide being constituted by a magnet and a said slider being constituted by a body of magnetic material, the lubricant material adhering to the first bearing surface.

6. A linear bearing arrangement according to claim 1 wherein said slide has a V-shaped channel, the first surface being constituted by the two faces of the channel and said slider has a triangular cross-section, the second bearing surface being constituted by two faces of the slider.

* * * * *